US009143592B2

(12) United States Patent
Wang et al.

(10) Patent No.: US 9,143,592 B2
(45) Date of Patent: Sep. 22, 2015

(54) MOBILE TERMINAL AND METHOD FOR DISPLAYING CONTACT LIST IN ORDER OF PRIORITY LEVELS

(75) Inventors: Han-Che Wang, New Taipei (TW); Chih-San Chiang, New Taipei (TW); Hua-Dong Cheng, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 543 days.

(21) Appl. No.: 13/527,889

(22) Filed: Jun. 20, 2012

(65) Prior Publication Data
US 2013/0122877 A1    May 16, 2013

(30) Foreign Application Priority Data

Nov. 16, 2011    (CN) .......................... 2011 1 0363421

(51) Int. Cl.
*H04M 1/2745* (2006.01)
*H04M 1/57* (2006.01)
*H04M 1/725* (2006.01)

(52) U.S. Cl.
CPC .. *H04M 1/274508* (2013.01); *H04M 1/274583* (2013.01); *H04M 1/575* (2013.01); *H04M 1/72572* (2013.01)

(58) Field of Classification Search
CPC ..................... H04M 1/2745; H04M 1/274508; H04M 1/274516; H04M 15/06; H04M 1/274583; H04M 1/57; H04M 1/575; H04M 1/72519; H04M 1/72572; H04M 2250/10; H04M 2250/60; H04M 3/42059; H04M 3/436; H04L 29/12047; H04L 61/1594; H04W 4/00
USPC ......................................................... 455/415
See application file for complete search history.

(56) References Cited

U.S. PATENT DOCUMENTS

| 5,592,546 | A  | * | 1/1997  | Takahashi ................ 379/355.05 |
| 6,249,579 | B1 | * | 6/2001  | Bushnell .................. 379/356.01 |
| 6,289,084 | B1 | * | 9/2001  | Bushnell ...................... 379/67.1 |
| 6,643,507 | B1 | * | 11/2003 | Chow et al. ................ 455/422.1 |
| 6,947,533 | B2 | * | 9/2005  | Okamura et al. ........ 379/142.06 |
| 7,502,606 | B2 | * | 3/2009  | Flynt et al. .................... 455/403 |
| 8,094,593 | B2 | * | 1/2012  | Sawada et al. ................ 370/310 |

(Continued)

FOREIGN PATENT DOCUMENTS

| CN | 101076050 A | 11/2007 |
| CN | 101729449 A | 6/2010  |

(Continued)

*Primary Examiner* — Matthew Sams
(74) *Attorney, Agent, or Firm* — Novak Druce Connolly Bove + Quigg LLP

(57) ABSTRACT

A method for displaying a contact list of a mobile terminal in order of priority levels is provided. The method includes steps: receiving an incoming call or message; obtaining an incoming phone number of the received call or message; finding out a calling contact associated with the incoming phone number on a contact list of the mobile terminal; obtaining remaining phone numbers associated with the calling contact; setting priority levels for all the phone numbers associated with the calling contact; and displaying all the phone numbers associated with the calling contact in an order of decreasing priority levels from high to low on a display screen of the mobile terminal A related mobile terminal is also provided.

5 Claims, 7 Drawing Sheets

(56) References Cited

U.S. PATENT DOCUMENTS

| | | | |
|---|---|---|---|
| 8,417,675 B2 * | 4/2013 | Eldering et al. | 707/694 |
| 2003/0199288 A1 * | 10/2003 | Bodnar et al. | 455/557 |
| 2004/0070627 A1 * | 4/2004 | Shahine et al. | 345/794 |
| 2006/0052091 A1 * | 3/2006 | Onyon et al. | 455/415 |
| 2008/0014906 A1 * | 1/2008 | Tysowski et al. | 455/412.1 |
| 2008/0242282 A1 * | 10/2008 | Kuhl et al. | 455/415 |
| 2008/0250066 A1 * | 10/2008 | Ekstrand et al. | 707/104.1 |
| 2008/0273677 A1 * | 11/2008 | Alfano et al. | 379/93.17 |
| 2009/0197621 A1 * | 8/2009 | Book | 455/457 |
| 2010/0330972 A1 * | 12/2010 | Angiolillo | 455/418 |
| 2011/0014932 A1 * | 1/2011 | Estevez | 455/466 |
| 2014/0006343 A1 * | 1/2014 | Allison | 707/609 |

FOREIGN PATENT DOCUMENTS

| | | |
|---|---|---|
| CN | 102104685 A | 6/2011 |
| CN | 201893833 U | 7/2011 |

* cited by examiner

MOBILE TERMINAL AND METHOD FOR DISPLAYING CONTACT LIST IN ORDER OF PRIORITY LEVELS

BACKGROUND

1. Technical Field

The present disclosure relates to the communication technical field and, particularly, to a mobile terminal and a method for displaying a contact list in an order of priority levels.

2. Description of Related Art

Today, many people have more than one phone number, such as mobile phone number, office number, home number, and so on. Many mobile phone users save a number of phone numbers associated with a contact in a contact list of the mobile phone. These phone numbers may have different geographic location and some of them may be in a non connectable status, such as no answer, power off, or shutdown state, sometimes. If a mobile phone user needs to telephone a contact having more than one phone number, the user dials the first phone number of the contact which is displayed at the top, if the top number is in a non connectable status, the user then dials the second number . . . . Therefore, in order to quickly contact a contact having more than one phone number at any time, the user needs to manually update the display order of the phone numbers associated with the contact in the contact list. However, the manually updating operation is time-consuming and inconvenient.

Therefore, a mobile terminal and a method for displaying a contact list in an order of priority levels are needed.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
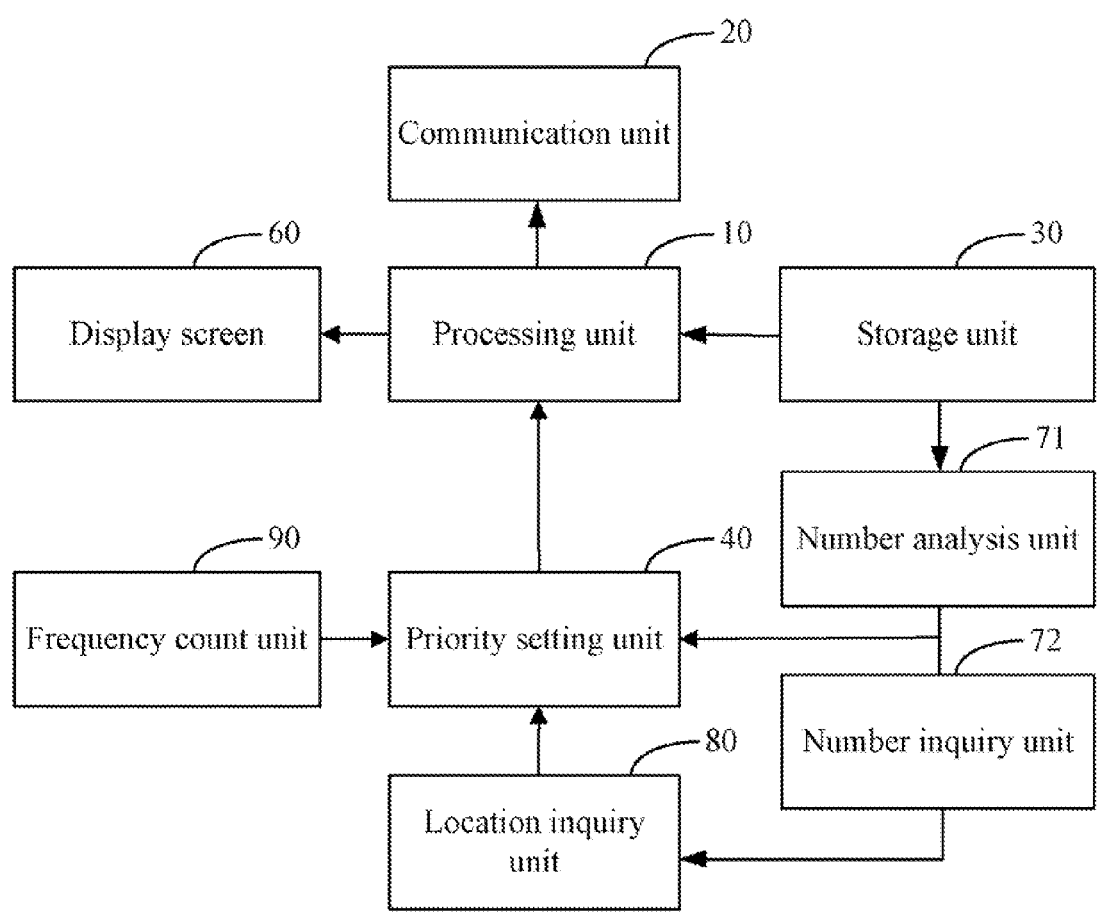
FIG. 1 is a block diagram of a mobile terminal for displaying a contact list in an order of priority levels, according to an embodiment.

Referring to FIG. 1, is a mobile terminal 100 for displaying a contact list in an order of priority levels. The mobile terminal 100 includes a processing unit 10, a communication unit 20, a storage unit 30, a priority setting unit 40 and a display screen 60. The mobile terminal 100 includes but not limited to mobile phone, PDA, notebook computer, for example. The processing unit 10 communicates with other mobile terminal through the communication unit 20. The storage unit 30 stores a contact list, the contact list contains a number of contacts, and at least one of the contacts has a number of phone numbers associated therewith. The priority setting unit 40 is configured for setting priority levels for all phone numbers associated with a calling contact, and controlling the display screen 60 to display all the phone numbers associated with the calling contact in an order of priority levels.

In the embodiment, the mobile terminal 100 further includes a number analysis unit 71 and a number inquiry unit 72. Each time the mobile terminal 100 receives an incoming call or message, the number analysis unit 71 obtains an incoming phone number of the received incoming call or message, and the number inquiry unit 72 finds out a calling contact associated with the incoming phone number on the contact list. In the embodiment, if the incoming phone number has been saved in the contact list, that is if the calling contact has been saved in the contact list, the number inquiry unit 72 simultaneously obtains remaining phone numbers associated with the calling contact. It should be understood that, if the incoming phone number is new to the mobile terminal 100, and further if the user adds the incoming "new" phone number to a contact saved in the contact list, the number inquiry unit 72 simultaneously obtains all old phone numbers associated with the contact.

Figure 2:
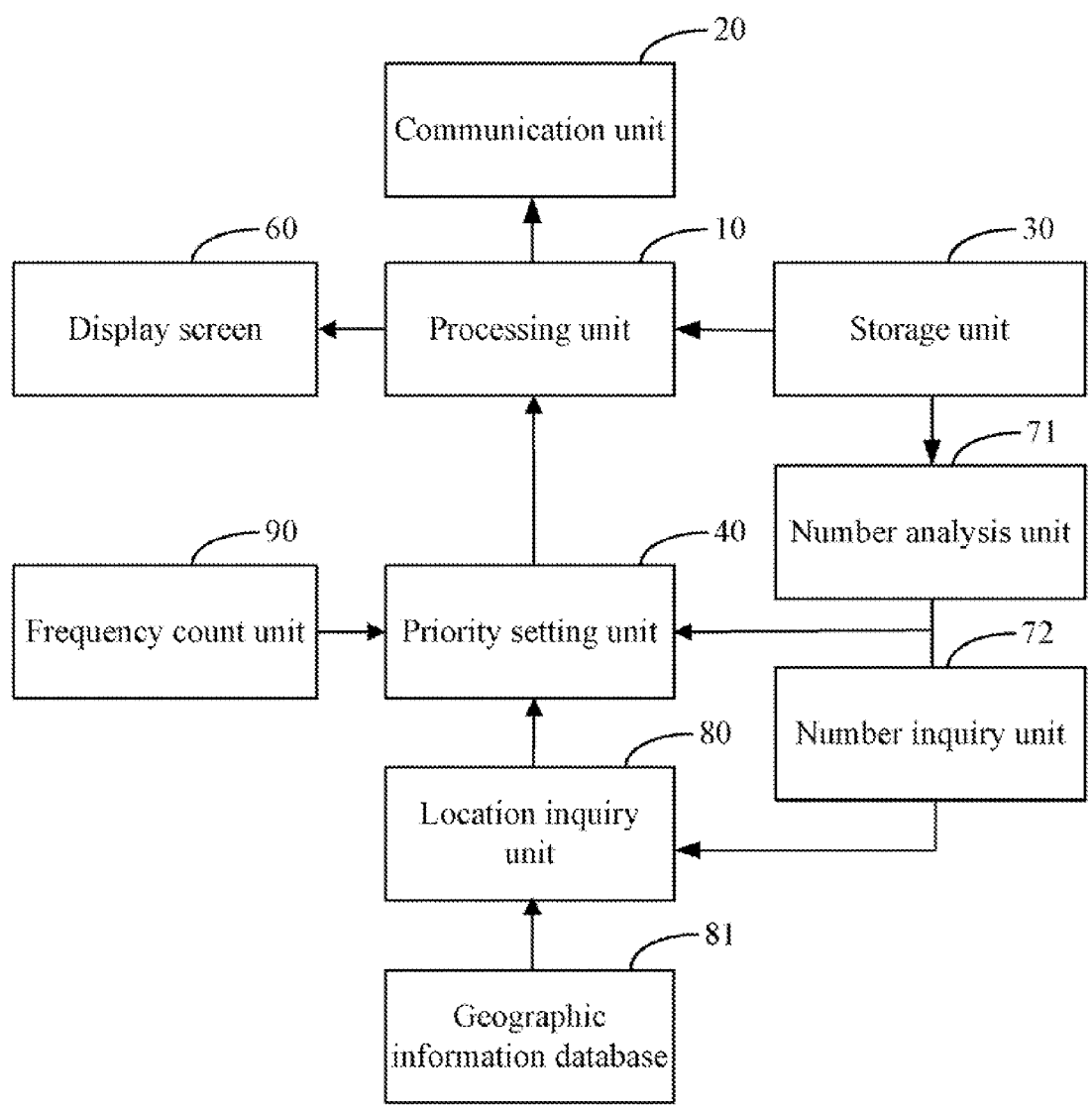
FIG. 2 is another block diagram of a mobile terminal for displaying a contact list in an order of priority levels, according to another embodiment.

In the embodiment, the mobile terminal 100 further includes a location inquiry unit 80, which is configured for determining a geographic location associated with each of the phone numbers associated with the calling contact. In one embodiment, the location inquiry unit 80 determines a geographic location associated with the phone numbers from a web server. In an alternative embodiment, as shown in FIG. 2, the mobile terminal 100' further includes a geographic information database 81, which pre-stores mapping relationship between the geographic locations and the phone numbers associated with the calling contact. The location inquiry unit 80 accesses the geographic locations database 81 to determine the geographic location associated with each phone number associated with the calling contact. In the embodiment, the geographic information database 81 can be updated by wired or wireless communication network, to maintain the accuracy of its data.

In one embodiment, the priority setting unit 40 sets a first priority level for the incoming phone number, that is, the incoming phone number is displayed in front of all other phone numbers of the calling contact. The priority setting unit 40 also sets a second priority level for the phone numbers associated with the calling contact, which have the same geographic locations as the incoming phone number. That is, the phone numbers associated with the calling contact having the same geographic locations as the incoming phone number are displayed in front of all other phone numbers associated with the calling contact, which have different geographic locations from the incoming phone number. In an alternative embodiment, the priority setting unit 40 sets the first priority level for both the incoming phone number and the phone numbers associated with the calling contact having the same geographic locations as the incoming phone number. In another embodiment, the priority setting unit 40 further sets a third priority level for the remaining phone numbers associated with the calling contact having different geographic locations from the incoming phone number.

Furthermore, if more than one phone numbers associated with the calling contact have a same priority level, the priority setting unit 40 further sets sub-priority levels for the phone numbers having the same priority level according to one or more predetermined rules. In the embodiment, the one or more predetermined rules can be determined according to at least one factor selected from the group consisting of: a last communication time, a total communication time, and types of the phone numbers.

In the embodiment, the mobile terminal 100 further includes a frequency count unit 90, which records the communication times of the phone numbers. When user answers a call, dials a number, receives a message, or sends a message, the frequency count unit 90 increases a count value of the total communication times of the phone number by one. In the embodiment, the frequency count unit 90 clears the count values of the communication times of all phone numbers of all contacts and re-counts after a predetermined time interval (eg. one month).

Then, the priority setting unit 40 controls the display screen 60 to display all the phone numbers associated with the calling contact in an order of decreasing priority levels and sub-priority levels from high to low. Therefore, afterwards, each time the user of the mobile terminal opens the contact list to dial a contact, the most recently dialed number is displayed on the top under the contact to facilitate the user to contact the contact.

It should be understood that, in another embodiment, user can also manually update the priority levels of the phone numbers associated with the contact at any time.

Figure 3:
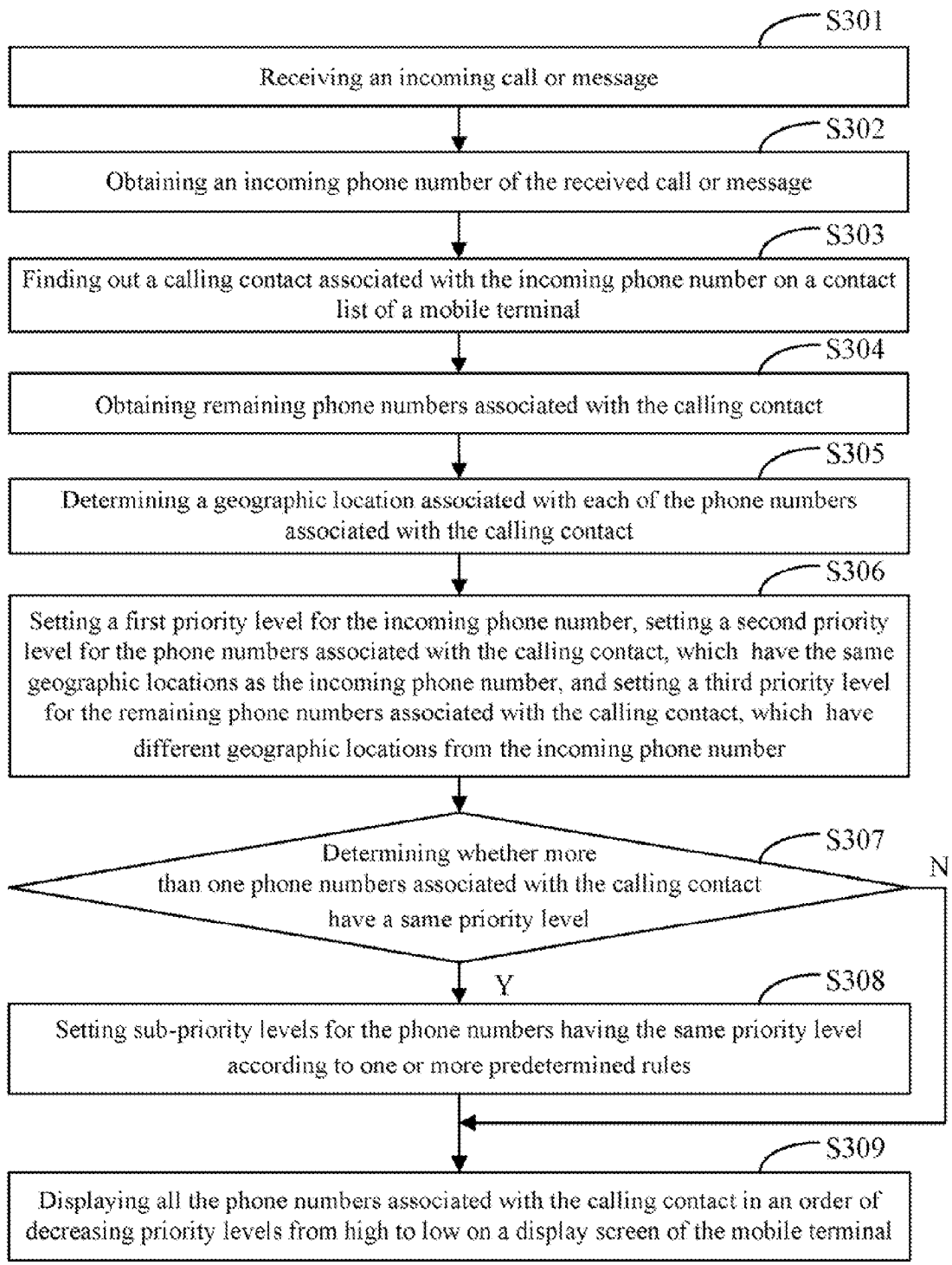
FIG. 3 is a flowchart illustrating a method for displaying a contact list of a mobile terminal in an order of priority levels, according to an embodiment.

Referring to FIG. 3, is a flowchart illustrating a method for displaying a contact list of a mobile terminal in an order of priority levels.

In step S301, the mobile terminal 100 receives an incoming call or message.

In step S302, the number analysis unit 71 obtains an incoming phone number of the received call or the message.

In step S303, the number inquiry unit 72 finds out a calling contact associated with the incoming phone number on a contact list of the mobile terminal.

In step S304, the number inquiry unit 72 simultaneously obtains remaining phone numbers associated with the calling contact.

In the embodiment, if the incoming phone number has been saved in the contact list, that is if the calling contact has been saved in the contact list, the number inquiry unit 72 simultaneously obtains remaining phone numbers associated with the calling contact. If the incoming phone number is new to the mobile terminal 100, and further if the user adds the incoming "new" phone number to a contact saved in the contact list, the number inquiry unit 72 simultaneously obtains all old phone numbers of the contact.

In step S305, the location inquiry unit 80 determines a geographic location associated with each of the phone numbers associated with the calling contact.

In one embodiment, the location inquiry unit 80 determines a geographic location associated with the phone numbers from a web server. In an alternative embodiment, the location inquiry unit 80 accesses the geographic locations database 81 to determine the geographic locations associated with each phone number associated with the calling contact.

In step S306, the priority setting unit 40 sets a first priority level for the incoming phone number, sets a second priority level for the phone numbers associated with the calling contact having the same geographic locations as the incoming phone number, and sets a third priority level for the phone numbers associated with the calling contact having different geographic locations from the incoming phone number.

In step S307, the priority setting unit 40 determines whether more than one phone numbers associated with the calling contact have a same priority level. If more than one phone numbers associated with the calling contact have a same priority level, the procedure goes to step S308, otherwise the procedure goes to step S309.

In step S308, the priority setting unit 40 further sets sub-priority levels for the phone numbers having the same priority level according to one or more predetermined rules. In the embodiment, the one or more predetermined rules can be determined according to at least one factor selected from the group consisting of: a last communication time, a total communication time, and types of the phone numbers.

In step S309, the priority setting unit 40 controls the display screen 60 to display all the phone numbers associated with the calling contact in an order of decreasing priority levels and sub-priority levels from high to low.

Thereby, the problem that the display order of the display order of multiple phone numbers associated with a contact in the contact list of the mobile terminal cannot be automatically updated in real time is solved.

Figure 4:
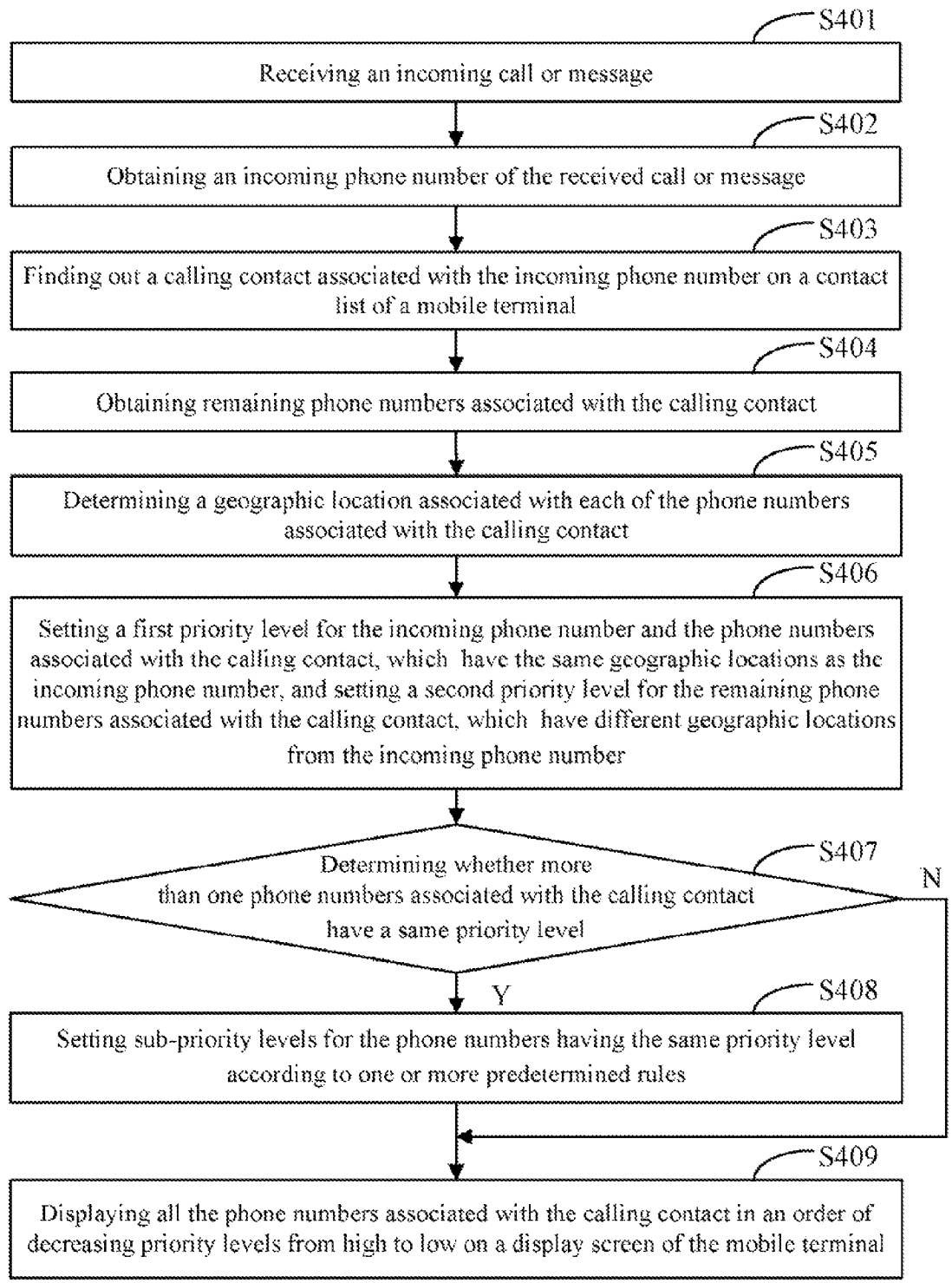
FIG. 4 is another flowchart illustrating a method for displaying a contact list of a mobile terminal in an order of priority levels, according to an embodiment.

Referring to FIG. 4, is another flowchart illustrating a method for displaying a contact list of a mobile terminal in an order of priority levels.

In step S401, the mobile terminal 100 receives an incoming call or message.

In step S402, the number analysis unit 71 obtains an incoming phone number of the received call or message.

In step S403, the number inquiry unit 72 finds out a calling contact associated with the incoming phone number on a contact list of the mobile terminal.

In step S404, the number inquiry unit 72 simultaneously obtains remaining phone numbers associated with the calling contact.

In step S405, the location inquiry unit 80 determines a geographic location associated with each of the phone numbers associated with the calling contact.

In step S406, the priority setting unit 40 sets a first priority level for both the incoming phone number and the phone numbers associated with the calling contact having the same geographic locations as the incoming phone number, and sets a second priority level for the phone numbers associated with the calling contact having different geographic locations from the incoming phone number.

In step S407, the priority setting unit 40 determines whether more than one phone numbers associated with the calling contact have a same priority level. If more than one phone numbers associated with the calling contact have a same priority level, the procedure goes to step S408, otherwise the procedure goes to step S409.

In step S408, the priority setting unit 40 further sets sub-priority levels for these phone numbers having the same priority level according to one or more predetermined rules. In the embodiment, the one or more predetermined rules can be determined according to at least one factor selected from the group consisting of: a last communication time, a total communication time, and types of the phone numbers.

In step S409, the priority setting unit 40 controls the display screen 60 to display all the phone numbers associated with the calling contact in an order of decreasing priority levels and sub-priority levels from high to low.

Figure 5:
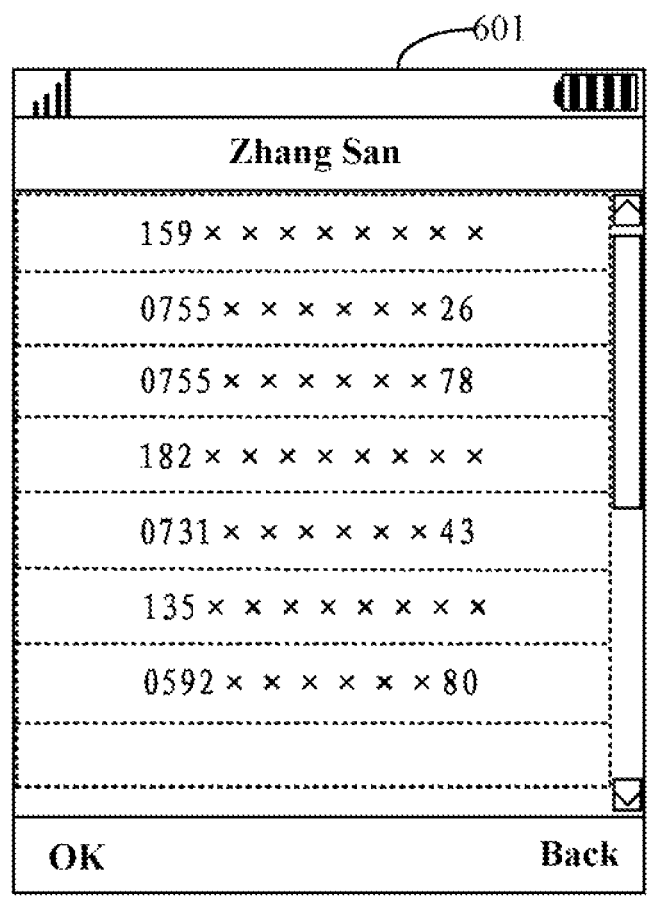
FIG. 5 is a display interface showing a number of phone numbers associated with a contact, according to an embodiment.
Figure 6:
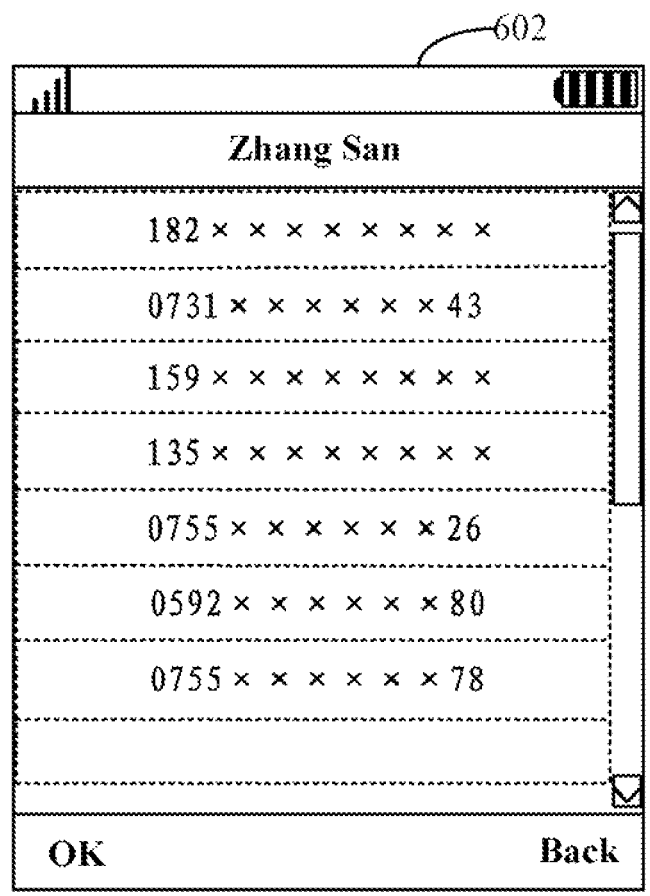
FIG. 6 is another display interface showing a number of phone numbers associated with a contact, according to an embodiment.
Figure 7:
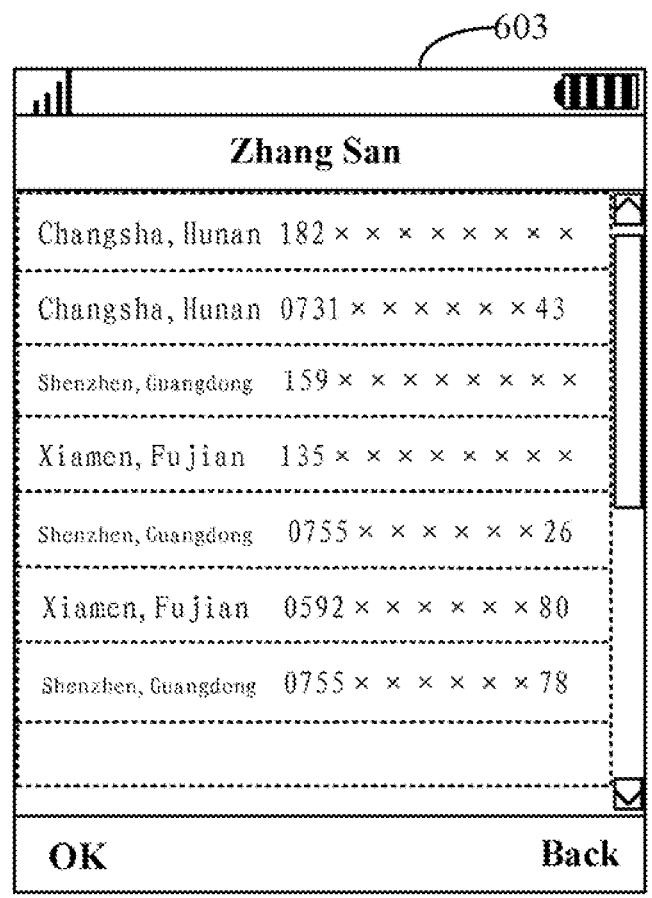
FIG. 7 is a display interface showing a number of phone numbers associated with a contact, according to another embodiment.

FIG. 5, is a display interface 601 showing a number of phone numbers associated with a contact. The contact, for example, if Zhang San, is in Shenzhen, Guangdong now, and the display interface 601 displays his Shenzhen mobile phone number "159X X X X X X X X" at the top, then his Shenzhen home number or office number "0755X X X X X X26", "0755X X X X X X78", and his other numbers follow. If Zhang San reaches another place, for example, Changsha, Hunan, and calls the user of the mobile terminal from his Changsha mobile phone number "182X X X X X X X X", the mobile terminal 100 automatically re-sorts Zhang San's phone numbers, and puts Zhang San's Changsha phone number ahead such as what shown in display interface 602 of FIG. 6. That is, his Changsha mobile phone number is displayed at the top, then his Changsha office number "0731X X X X X43" follows, and his other numbers at last. In another embodiment, referring to FIG. 7, the display screen 60 can also display the geographic location associated with each phone number associated with the contact. The function of displaying the geographic location associated with each phone number is optional.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A mobile terminal comprising:
 a display screen;
 a storage unit configured for storing a contact list, the contact list containing a plurality of contacts, at least one of the contacts having a plurality of phone numbers associated therewith;
 a number analysis unit configured for obtaining an incoming phone number of a received call or message;
 a number inquiry unit configured for finding out a calling contact associated with the incoming phone number on the contact list, and obtaining remaining phone numbers associated the calling contact;
 a location inquiry unit configured for determining a geographic location associated with each of the phone numbers associated with the calling contact; and
 a priority setting unit configured for setting a first priority level for the incoming phone number, setting a second priority level for the phone numbers associated with the calling contact which have the same geographic locations as the incoming phone number, and setting a third priority level for the remaining phone numbers associated with the calling contact which have different geographic locations from the incoming phone number, and controlling the display screen to display all the phone numbers associated with the calling contact in an order of decreasing priority levels from high to low, wherein the first priority level is defined to be the highest priority level.

2. The mobile terminal as described in claim 1, further comprising a geographic information database storing mapping relationship between the geographic locations and the phone numbers associated with the calling contact.

3. The mobile terminal as described in claim 1, wherein if more than one phone numbers associated with the calling contact have a same priority level, the priority setting unit is further configured to set sub-priority levels for the phone numbers having the same priority level according to one or more predetermined rules, the one or more predetermined rules are determined according to at least one factor selected from the group consisting of: a last communication time, a total communication time, and types of the phone numbers.

4. A method for displaying a contact list of a mobile terminal in an order of priority levels, the method comprising:
 receiving an incoming call or message;
 obtaining an incoming phone number of the received call or message;
 finding out a calling contact associated with the incoming phone number on a contact list of the mobile terminal;
 obtaining remaining phone numbers associated with the calling contact;
 determining a geographic location associated with each of the phone numbers associated with the calling contact;
 setting a first priority level for the incoming phone number, setting a second priority level for the phone numbers associated with the calling contact which have the same geographic locations as the incoming phone number, and setting a third priority level for the remaining phone numbers associated with the calling contact which have different geographic locations from the incoming phone number, wherein the first priority level is defined to be the highest priority level; and
 displaying all the phone numbers associated with the calling contact in an order of decreasing priority levels from high to low on a display screen of the mobile terminal.

5. The method as described in claim 4, further comprising determining whether more than one phone numbers associated with the calling contact have a same priority level, if more than one phone numbers associated with the calling contact have a same priority level, setting sub-priority levels for the phone numbers having the same priority level according to one or more predetermined rules, wherein the one or more predetermined rules are determined according to at least one factor selected from the group consisting of: a last communication time, a total communication time, and types of the phone numbers.

* * * * *